US012809549B2

(12) United States Patent
Muchherla et al.

(10) Patent No.: US 12,809,549 B2
(45) Date of Patent: Nov. 24, 2026

(54) CALIBRATING DATA RELOCATION FROM BUFFER TO MEMORY DEVICE IN A MEMORY SUB-SYSTEM

(71) Applicant: Micron Technology, Inc., Boise, ID (US)

(72) Inventors: Kishore Kumar Muchherla, San Jose, CA (US); Akira Goda, Tokyo (JP); Huai-Yuan Tseng, San Ramon, CA (US); David Scott Ebsen, Minnetonka, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/901,899

(22) Filed: Sep. 30, 2024

(65) Prior Publication Data

US 2025/0130736 A1 Apr. 24, 2025

Related U.S. Application Data

(60) Provisional application No. 63/591,404, filed on Oct. 18, 2023.

(51) Int. Cl.
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679
See application file for complete search history.

(56) References Cited

U.S. PATENT DOCUMENTS

| | | | | |
|---|---|---|---|---|
| 10,109,361 | B1 | 10/2018 | Khakifirooz et al. | |
| 2020/0133585 | A1* | 4/2020 | Muchherla | G06F 3/0679 |
| 2021/0158874 | A1* | 5/2021 | Jang | G06F 12/0246 |
| 2021/0391002 | A1 | 12/2021 | Gorobets et al. | |
| 2022/0076735 | A1* | 3/2022 | Inbar | G06F 13/1673 |
| 2022/0199165 | A1 | 6/2022 | Nguyen et al. | |
| 2023/0091792 | A1* | 3/2023 | Kanno | G06F 3/0679 711/103 |
| 2023/0207028 | A1* | 6/2023 | Huang | G11C 29/44 365/185.22 |

OTHER PUBLICATIONS

International Search Report and Written Opinion for International Application No. PCT/US2024/051850, mailed Jan. 24, 2025, 9 Pages.

* cited by examiner

*Primary Examiner* — Francisco A Grullon
(74) *Attorney, Agent, or Firm* — Lowenstein Sandler LLP

(57) ABSTRACT

A processing device in a memory sub-system determines that an amount of host data in a first portion of a memory device configured as a program buffer satisfies a buffer threshold criterion and initiates an initial program pass of first host data from the program buffer to a second portion of the memory device configured as a primary memory. The processing device further determines that the first host data is to be evicted from the program buffer, and initiating a final program pass of the first host data from the program buffer to the primary memory.

20 Claims, 5 Drawing Sheets

CALIBRATING DATA RELOCATION FROM BUFFER TO MEMORY DEVICE IN A MEMORY SUB-SYSTEM

RELATED APPLICATIONS

This application claims the benefit of priority from U.S. Provisional Application No. 63/591,404, filed Oct. 18, 2023, the entire contents of which are hereby incorporated by reference herein

TECHNICAL FIELD

Embodiments of the disclosure relate generally to memory sub-systems, and more specifically, relate to calibrating data relocation from a buffer to a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
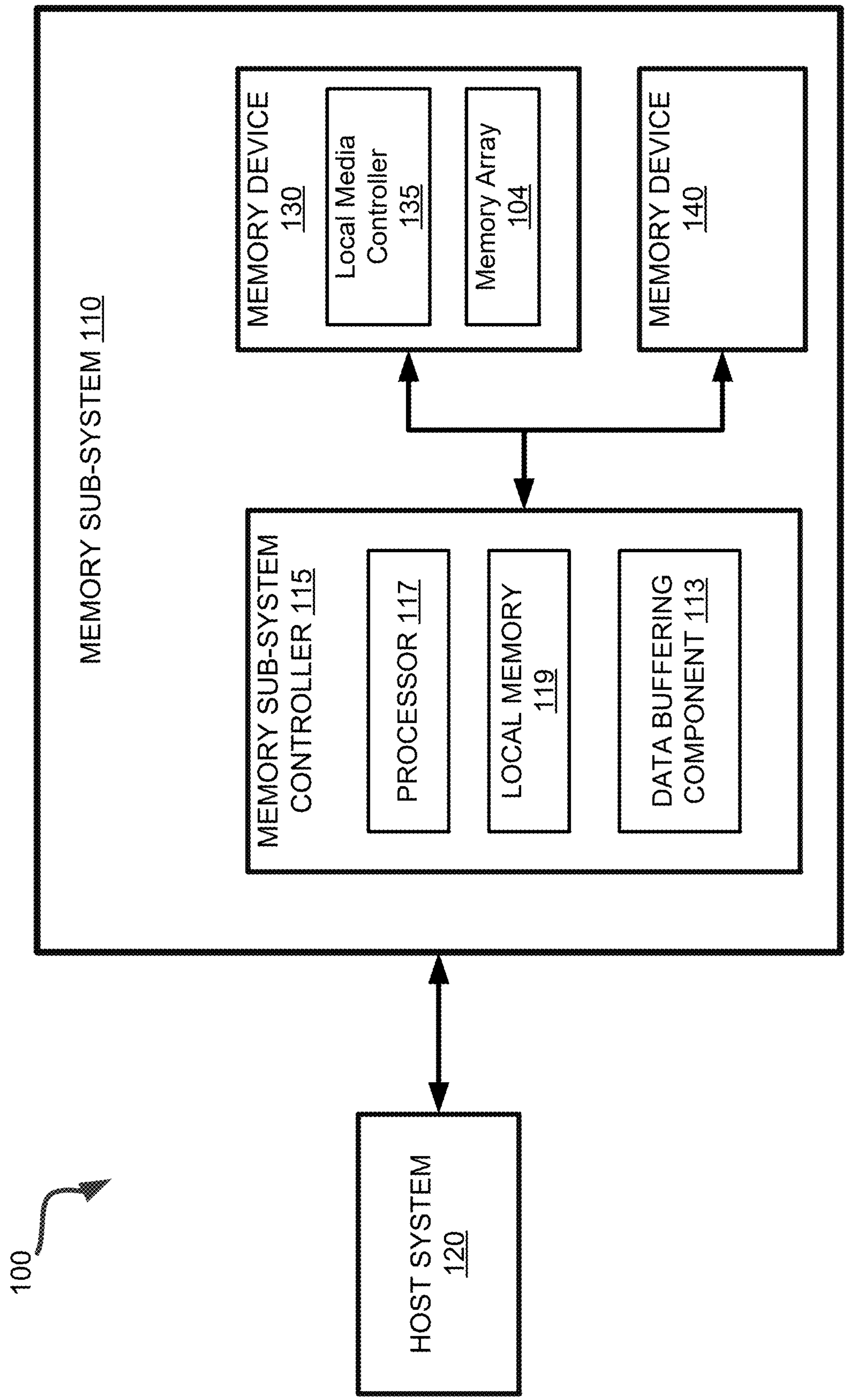
FIG. 1 illustrates an example computing system that includes a memory sub-system in accordance with some embodiments of the present disclosure.

Aspects of the present disclosure are directed to calibrating data relocation from a buffer to a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. Some memory devices use certain types of memory cells, such as quad-level cell (QLC) memory cells, which store four bits of data in each memory cell, which make it affordable to move more applications from legacy hard disk drives to newer memory sub-systems, such as NAND solid-state drives (SSDs). QLC memory is particularly well-tuned for read-intensive workloads, which are often seen in data center applications where data is normally generated once, and then read regularly to perform calculations and analysis. Thus, QLC memory is often considered to be fragile and used only for very light write workloads, as the endurance and Quality of Service (QOS) can limit usability in data center applications.

Certain memory sub-systems implementing QLC memory use a 16-16 coarse-fine, two pass, programming algorithm. Since a QLC memory cell stores four bits of data, there are 16 possible programming levels (i.e., $2^4$) representing the possible values of those four bits of data. Programming the memory cells associated with a given wordline begins by initially programming all 16 levels in a first pass. The objective of this initial "coarse" pass is to program all cells rapidly to slightly below their final target programming levels. During the slower "fine" second pass, the memory cells are programmed to a slightly higher final target programmed voltage. Such two-pass programming minimizes cell to cell (C2C) interference, as every cell and its neighbors are nearly at their final target programmed voltage when the fine programming pass is performed, and need only be "touched-up." The combination of not requiring precision programming in the first pass, and the minimized C2C coupling, leads to fast programming with high read window budget (RWB). Such 16-16 coarse-fine programming, however, utilizes a program buffer, such as single level cell (SLC) memory (i.e., memory cells storing one bit of data per cell), where all data can be written before the first pass to protect against asynchronous power loss (APL). The data can remain in the program buffer until the second program pass is performed and the data is committed to the QLC memory, at which time, the data can be removed from the program buffer to make room for additional data. The amount of data that is to be stored in the program buffer at any one point in time (i.e., the amount of valid coarse data pages) is relatively small compared to the size of the QLC memory, and thus the size of the program buffer need not be very large. With the large amounts of data passing through SLC memory over time, however, the underlying media can wear out, unless larger amounts of SLC memory are allocated for the program buffer. Memory blocks allocated as SLC memory take away space from QLC memory, however, thereby reducing the overall capacity of the memory device, and result in additional QLC write amplification, which reduces the endurance of the memory device and degrades random write performance. Thus, the size of the program buffer is often increased due to endurance concerns, rather than the need to store a higher number of valid coarse data pages.

Given that the program buffer may be significantly larger than the amount of data that is stored therein at any point in time, there can be the option to leave the data in the program buffer for some amount of time before it is written to the QLC memory. Depending on the workload, the host system may frequently overwrite (e.g., invalidate and replace) data that was recently written to the memory sub-system. Thus, in many implementations, the longer that data can remain in the program buffer, the more likely it is to be overwritten, and thus such data need not be written to QLC memory at all. Accordingly, it can be beneficial to leave the data in the program buffer for as long as possible before the first pass is performed to coarsely program the data to the QLC memory.

The nature of the 16-16 coarse-fine, two pass, programming algorithm allows for correction of certain programming side effects, such as quick charge loss (QCL). Quick charge loss is the result of electrons trapped in a tunnel oxide layer after the application of the programming pulse moving back into a channel region of a string of memory cells, thereby reducing the level of charge stored in the programmed memory cells. The severity of QCL is proportional to the number of electrons added during programming. A multi-pass program algorithm can mitigate the QCL, however. During the first pass, more electrons are added to a cell as it is programmed from erase state to a first pass state. During the time interval in between the first pass and the second pass, the cell loses charge in form of QCL. During the second programming pass, the number of electrons added to the cell are fewer as the cell Vt is no longer programmed from erase state but from the intermediate Vt state created during the first pass. The second programming pass can refill the charge lost by the cell. As the number of electrons added to the cell during the second pass is significantly smaller, QCL behavior is improved after the second programming pass. A program verify operation can subsequently be performed to identify the quick charge loss and the magnitude of the fine programming pulse (e.g., a "touch-up" pulse) can be modified to account for the quick charge loss. Thus, it can be desirable to leave a longer period of time between the first programming pass and the second programming pass to allow the quick charge loss to fully happen, so that it can be fully accounted for in the second programming pass. In order to increase this time between coarse and fine programming, it can be desirable to perform the first programming pass sooner, that both programming passes can be performed before the data is evicted from the program buffer. This is in conflict with the benefit of delaying the first programming pass and keeping the data in the program buffer as long as possible described above.

Aspects of the present disclosure address the above and other deficiencies by calibrating the data relocation from the program buffer to the QLC memory in order to balance the competing concerns. The memory sub-system controller can implement a program buffer management policy that balances the desire to maintain host data in the program buffer for as long as possible before initiating the coarse and fine programming passes and the desire to maximize the amount of time that is between the coarse and fine programming passes. In one embodiment, the memory sub-system controller sets a threshold indicating a portion of the program buffer that can be filled before initiating the coarse and fine programming passes to write the data from the program buffer to the QLC memory. This allows the data to remain in the program buffer for at least some amount of time, potentially allowing for it to be overwritten. Once the threshold is reached, the memory sub-system controller can initiate a coarse programming pass to write data from the program buffer to the QLC memory. The fine programming pass is delayed, however, until just before the data is to be evicted from the program buffer in order to maximize the time between the coarse and fine programming passes. In one embodiment, the threshold at which point coarse programming is initiated is configurable based on a measured overwrite rate of the host data in the program buffer. For example, if the memory sub-system controller determines that the overwrite rate has increased, the threshold can be increased in order to allow the host data to remain in the program buffer for longer before coarse programming is initiated. Conversely, if the memory sub-system controller determines that the overwrite rate has decreased, the threshold can be reduced in order to initiate coarse programming sooner, and increase the amount of time between the coarse and fine programming passes.

Advantages of the approach described herein include, but are not limited to, improved performance in the memory sub-system. By delaying initiation of the coarse programming pass for host data until the amount of data in the program buffer reaches the threshold, the likelihood of that data being overwritten is increased, potentially eliminating the need for that data to be written to the QLC memory, which reduces write traffic to QLC memory. In addition, increasing the time between the coarse programming pass and the fine programming pass allows for compensation of any quick charge loss, which improves data retention. Write amplification savings can reduce the dependence on over-provisioning (i.e., increased size of program buffer) and extended data retention can enable higher operating temperature and reduce reliance an error correction capability in the memory sub-system. Reducing the write traffic to QLC blocks reduces the program/erase cycles on NAND (which reduces the cell wear and improves cell characteristics), improves system performance (as lesser system resources are used for QLC traffic), consumes lesser power.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), or penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a data buffering component 113 that can implement a program buffer management policy that balances the desire to maintain host data in a program buffer for as long as possible before initiating the coarse and fine programming passes and the desire to maximize the amount of time that is between the coarse and fine programming passes. As host data is received from host system 120 to be programmed to memory device 130, data buffering component 113 can initially write the host data to a program buffer, such as a portion of memory array 104 configured as SLC memory. In one embodiment, data buffering component 113 sets a threshold indicating a portion of the program buffer that can be filled before initiating the coarse and fine programming passes to write the data from the program buffer to a portion of memory array 104 configured as QLC memory. As described in more detail below, this threshold can be configurable based on an overwrite rate of the host data in the program buffer. Once that threshold is met, data buffering component 113 can initiate an initial programming pass (i.e., a first or "coarse" pass) of the oldest host data in the program buffer to the QLC memory. As more and more data is written to the program buffer, the oldest host data will be grow closer and closer to being evicted from the program buffer. Upon determining that the oldest host data is about to be evicted from the program buffer, data buffering component 113 can initiate a final programming pass (i.e., a second or "fine" pass) of the oldest host data in the program buffer to the QLC memory. Further details with regards to the operations of data buffering component 113 are described below.

Figure 2:
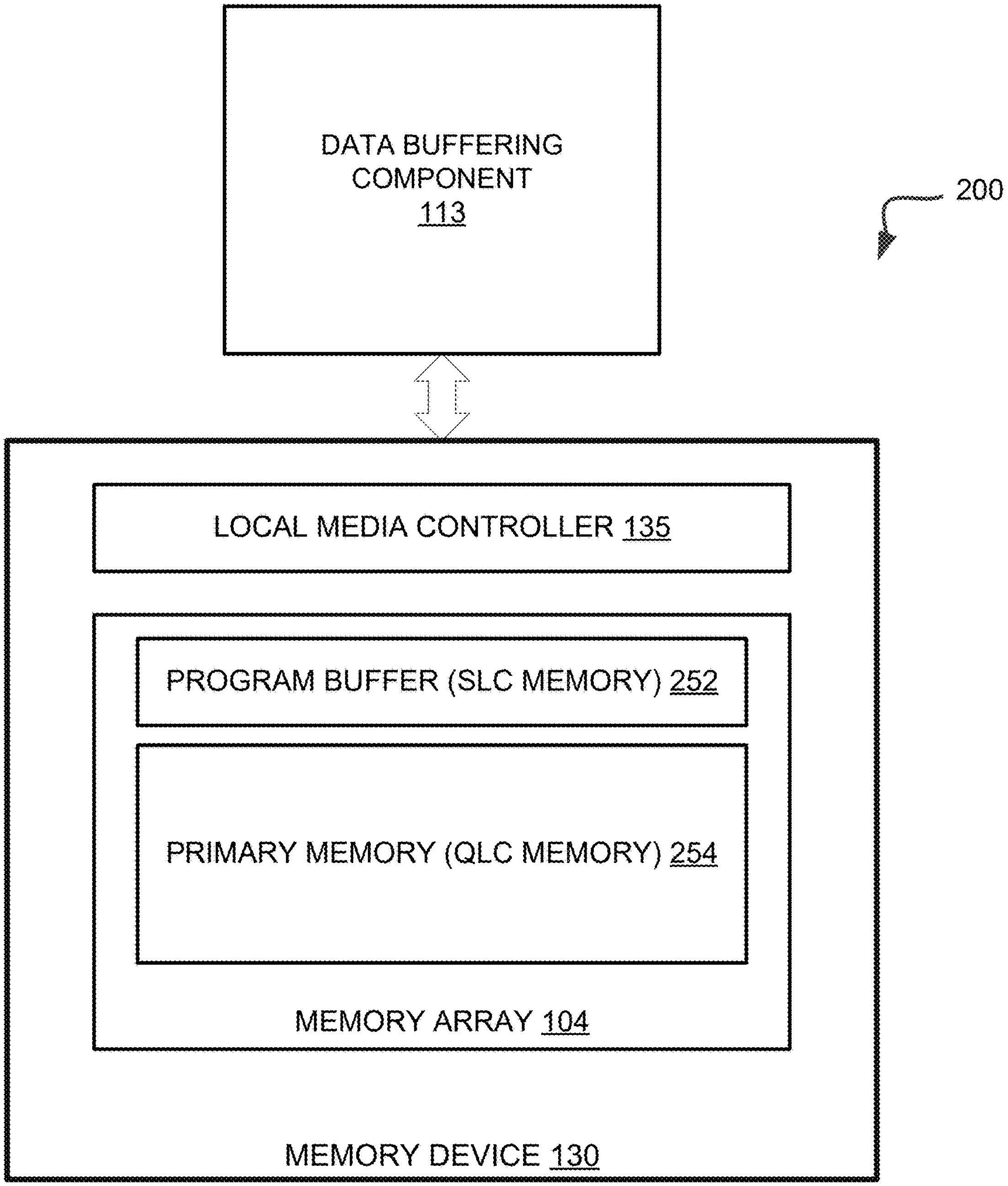
FIG. 2 is a block diagram illustrating a memory sub-system configured for calibrating data relocation from a buffer to a memory device in accordance with some embodiments of the present disclosure.

FIG. 2 is a block diagram illustrating a memory sub-system configured for calibrating data relocation from a buffer to a memory device in accordance with some embodiments of the present disclosure. In one embodiment, data buffering component 113 is operatively coupled with memory device 130. In one embodiment, memory device 130 includes local media controller 135 and memory array 104. Memory array 104 can include an array of memory cells formed at the intersections of wordlines and bitlines. In one embodiment, the memory cells are grouped in to blocks, which can be further divided into sub-blocks, where a given wordline is shared across a number of sub-blocks, for example. In one embodiment, each sub-block corresponds to a separate plane in the memory array 104. The group of memory cells associated with a wordline within a sub-block is referred to as a physical page. In one embodiment, there can be a first portion of the memory array 104 where the sub-blocks are configured as SLC memory and which can be used as a program buffer 252. In other embodiments, the program buffer 252 can be formed of memory having more than one bit per cell, such as MLC or TLC memory. In addition, there can be a second portion of the memory array 104 where the sub-blocks are configured as QLC memory and which can be used as primary memory 254. Depending on how they are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and QLC physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page. Depending on the embodiment, the primary memory 254 can be configured as some other type of memory besides QLC memory, such as multi-level cell (MLC) memory, triple level cell (TLC) memory, penta-level cell (PLC) memory, or any combination of such.

Depending on the programming scheme used, each logical page of a memory cell can be programmed in a separate programming pass, or multiple logical pages can be programmed together. For example, in a 16-16 programming algorithm for a QLC physical page, all page types are coarsely programmed on one pass and then touched up on a second pass. In a 4-16 programming algorithm, the LP and UP can be programmed on one pass and the XP and TP can be programmed on a second pass. Other programming schemes are possible. In one embodiment, data buffering component 113 can receive, for example, four pages of host data to be programmed to primary memory 254. Accordingly, in order for one bit from each of the four pages to be programmed to each memory cell, local media controller 135 can cause each memory cell to be programmed to one of 16 possible programming levels (i.e., voltages representing the 16 different values of those four bits). Thus, the four pages of host data will be represented by 16 different programming distributions. In one embodiment, data buffering component 113 can first write the pages of host data to program buffer 252 where the data can remain while the program buffer management policy is implemented. In one embodiment, data buffering component 113 sets a threshold indicating a portion of the program buffer 252 that can be filled before initiating the coarse and fine programming passes to write the data from the program buffer to primary memory 254. This threshold can be configurable based on an overwrite rate of the host data in the program buffer 252. Over time additional host data is written to program buffer 252 causing the amount of host data in program buffer 252 to increase. Once the amount of host data in program buffer 252 reaches the threshold, data buffering component 113 can initiate an initial programming pass (i.e., a first or "coarse" pass) of the oldest host data in the program buffer 252 to the primary memory 254. As more and more data is written to the program buffer 252, the oldest host data will be grow closer and closer to being evicted from the program buffer 252. Upon determining that the oldest host data is about to be evicted from the program buffer 252, data buffering component 113 can initiate a final programming pass (i.e., a second or "fine" pass) of the oldest host data in the program buffer to primary memory 254.

Figure 3:
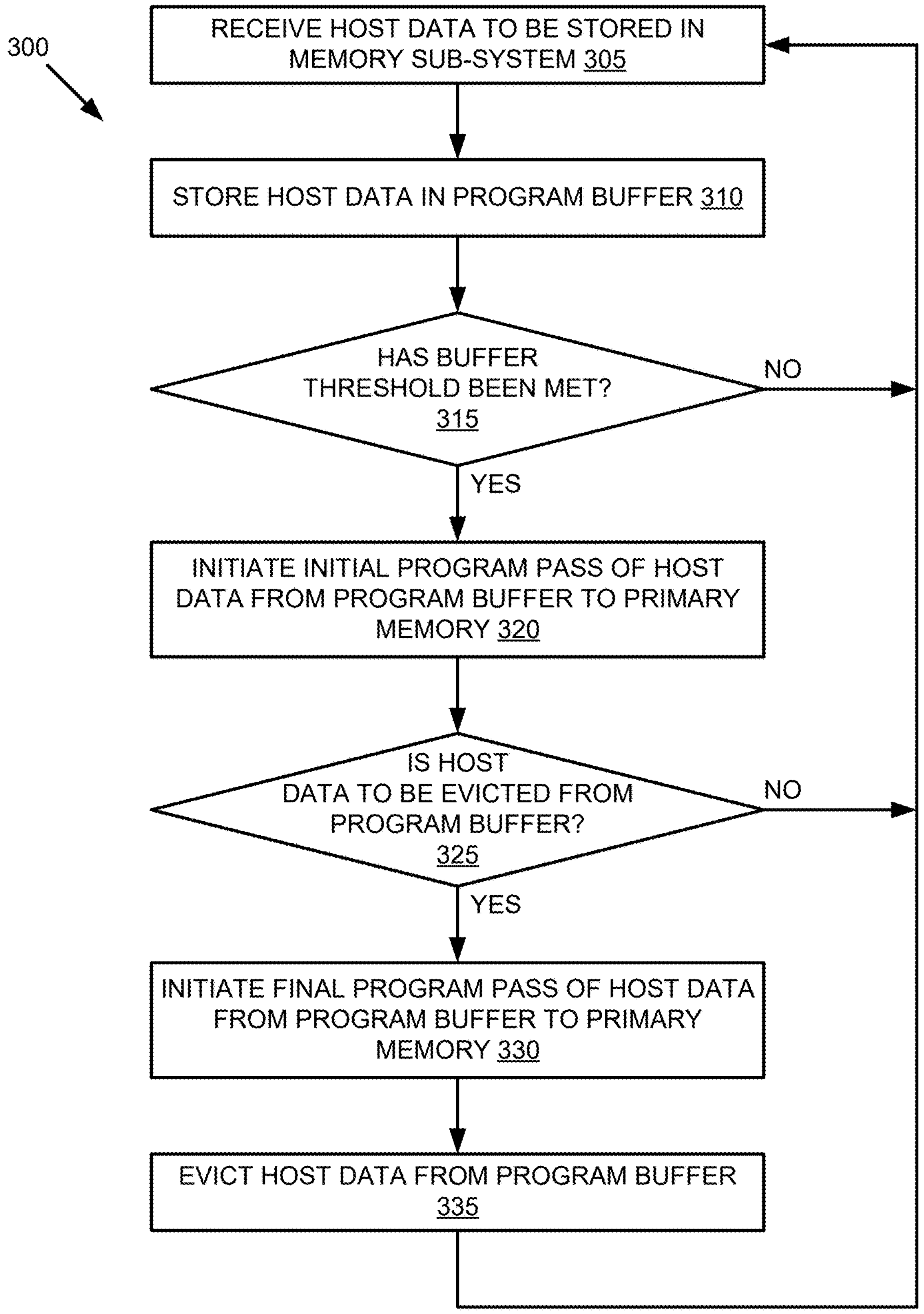
FIG. 3 is a flow diagram of an example method of calibrating data relocation from a buffer to a memory device in a memory sub-system in accordance with some embodiments of the present disclosure.

FIG. 3 is a flow diagram of an example method of calibrating data relocation from a buffer to a memory device in a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by data buffering component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., data buffering component 113) receives the host data to be programmed to a memory device, such as memory device 130 in memory sub-system 110. The host data can be received, for example, from a host system, such as host system 120. In one embodiment, the host data includes a plurality of pages (e.g., four pages) of host data.

Figure 4A:
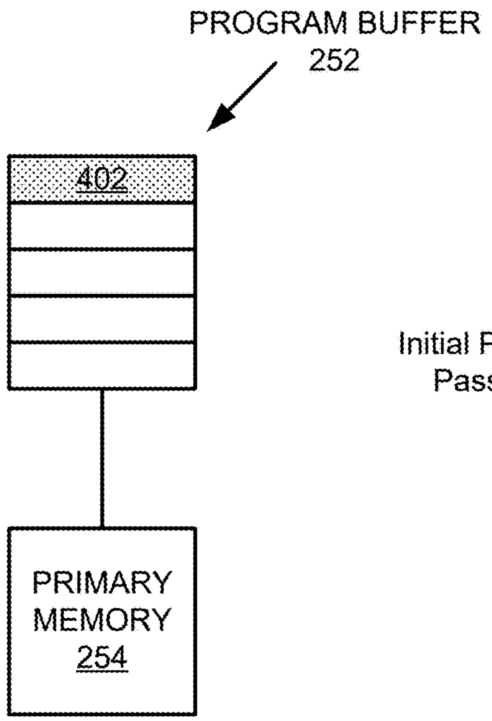
FIGS. 4A-4D are block diagrams illustrating calibrating data relocation from a buffer to a memory device in a memory sub-system in accordance with some embodiments of the present disclosure.
Figure 4B:
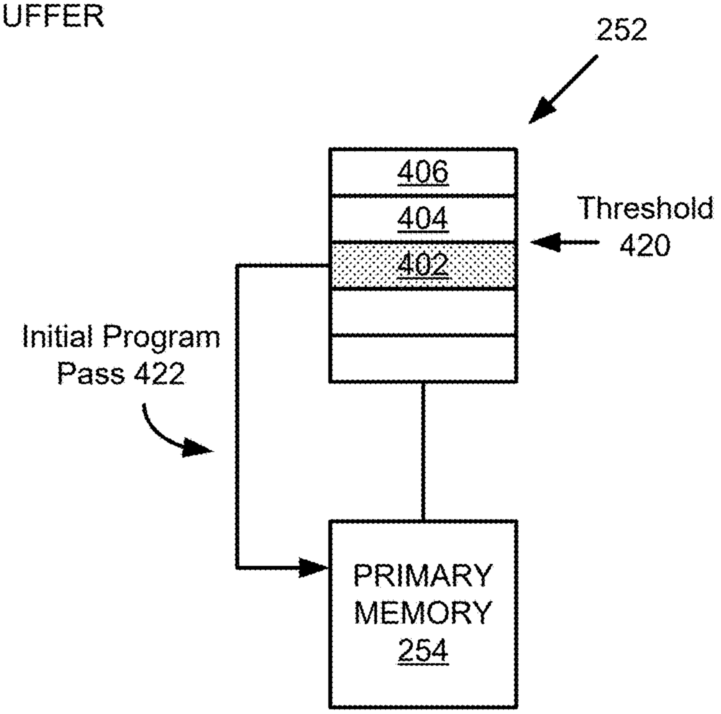

At operation 310, the processing logic initiates a program of first host data to a first portion of the memory device 130 configured as a program buffer 252. In one embodiment, the program buffer 252 includes a set of memory cells configured as single-level cell (SLC) memory. The program buffer 252 can include, for example, one portion of the memory device 130, where another portion of the memory device 130 is configured as a primary memory 254. In one embodiment, the program buffer 252 and the primary memory 254 are disposed on the same memory die. In other embodiments, the program buffer 252 and the primary memory 254 are disposed on separate memory dies. As illustrated in FIG. 4A, the first host data 402 can be programmed to the program buffer 252 at a first memory address. In one embodiment, program buffer 252 functions as a first-in-first-out (FIFO) buffer, such that first host data 402 is pushed down as additional host data 404 and 406 are programmed to program buffer 252, as illustrated in FIG. 4B.

At operation 315, the processing logic determines whether an amount of host data in the program buffer 252 satisfies a buffer threshold criterion. For example, as illustrated in FIG. 4B, the processing logic can define a threshold 420 representing a portion of the program buffer 252 that has been filled with data. Depending on the implementation, the threshold 420 can be defined as a particular memory address or a percentage of the total capacity of the program buffer 242. As additional host data 404 and 406 are programmed to program buffer 252, first host data 402 is pushed down until it eventually reaches and/or surpasses the threshold 420. In one embodiment, the processing logic determines that the amount of host data satisfies the buffer threshold criterion, when a given piece of host data, such as first host data, meets and/or exceeds the threshold 420.

In one embodiment, the threshold criterion (i.e., the value of threshold 420) is configurable based on an overwrite rate of the host data in the program buffer 252. For example, if data buffering component 113 determines that the overwrite rate has increased, the threshold 420 can be increased in order to allow the first host data 402 to remain in the program buffer 420 for longer before coarse programming is initiated. Conversely, if data buffering component 113 determines that the overwrite rate has decreased, the threshold 420 can be reduced in order to initiate coarse programming to primary memory 254 sooner, and increase the amount of time between the coarse and fine programming passes. To determine the overwrite rate, data buffering component 113 can periodically measure the amount of data provided to memory sub-system 110 by the host system 120, as well as the amount of data written from program buffer 252 to the primary memory 254. If the amounts of data are equal (i.e., all of the data provided to memory sub-system 110 is eventually written to primary memory 254), this is an indication that no data in program buffer 252 is being overwritten (e.g., invalidated by the host system and replaced with new data). If some lesser portion of the data provided to memory sub-system 110 is being written to primary memory 254, this is an indication that some amount of host data in program buffer 252 is being overwritten. Data buffering component 113 can track the percentage of the data provided to memory sub-system 110 that is being written to primary memory 254 over time and compare a later percentage to some previous percentage to determine the amount of change, and adjust the threshold 420 accordingly. In one embodiment, data buffering component 113 maintains a look-up table or other data structure including different values of threshold 420 corresponding to different overwrite rates and/or different amounts of change in the overwrite rate, which can be used to define the threshold criterion.

Responsive to determining that the amount of host data in the program buffer 252 satisfies the buffer threshold criterion, at operation 320, the processing logic initiates an initial program pass of first host data from the program buffer 252 to a second portion of the memory device 130 configured as a primary memory 254. In one embodiment, the primary memory 254 includes a set of memory cells configured as quad-level cell (QLC) memory. In one embodiment, as illustrated in FIG. 4B, the initial program pass 422 includes coarsely programming memory cells in the primary memory 254 to initial values representing a plurality of pages of the first host data. To initiate the initial program pass 422, the processing logic can provide instructions to local media controller 135 to cause the application of one or more programming pulses to one or more wordlines corresponding to memory cells in the primary memory 254.

Figure 4C:
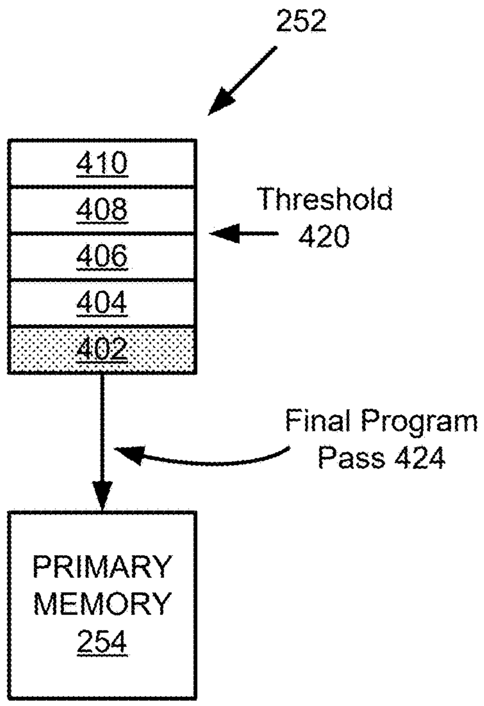

At operation 325, the processing logic determines whether the first host data is to be evicted from the program buffer 252. As additional host data 408 and 410 are programmed to program buffer 252, as illustrated in FIG. 4C, first host data 402 is pushed further down until it eventually reaches the bottom of program buffer 252, and is thus the next data to be evicted from program buffer 252. In other embodiments, there can be some other eviction threshold defined, and the processing logic can determine whether the first data 402 has reached this eviction threshold.

Responsive to determining that the first host data is to be evicted from the program buffer 252, at operation 330, the processing logic initiates a final program pass of the first host data from the program buffer 252 to the primary memory 254. In one embodiment, as illustrated in FIG. 4C, the final program pass 424 comprises finely programming the memory cells in the primary memory 254 to final values representing the plurality of pages of the first host data. To initiate the final program pass 424, the processing logic can provide instructions to local media controller 135 to cause the application of one or more touch-up programming pulses to the one or more wordlines corresponding to the memory cells in the primary memory 254.

Responsive to completing the final program pass 424 of the first host data to the primary memory 254, at operation 335, the processing logic evicts the first host data 402 from the program buffer 252. First host data 402 can be removed from program buffer 252 to make space for new host data 412 which can be added.

Figure 4D:
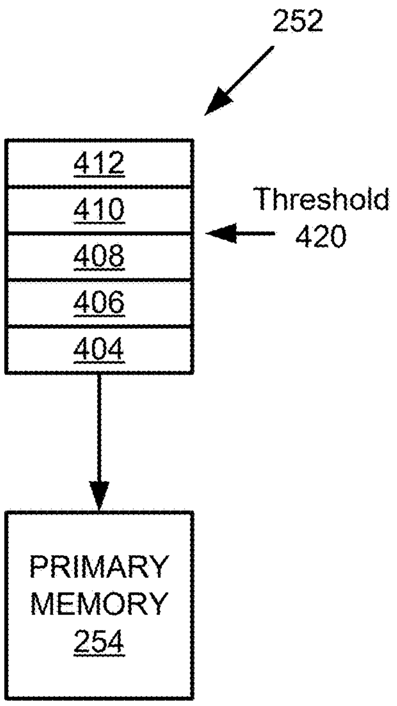

In one embodiment, each time new host data is programmed to program buffer 252, an initial program pass and a final program pass can be performed to program host data from program buffer 252 to primary memory 254. For example, in FIG. 4C, host data 406 has reached the threshold 420 and the processing logic can thus initiate an initial program pass of host data 406 to primary memory 254. Depending on the implementation the initial program pass of host data 406 can occur either before or after the final program pass 424 of first host data 402. Similarly, in FIG. 4D, host data 408 has reached the threshold 420 and host data 404 is to be evicted from program buffer 242. Accordingly, the processing logic can initiate an initial program pass of host data 408 to primary memory 254 and a final program pass of host data 404 to primary memory 254.

Figure 5:
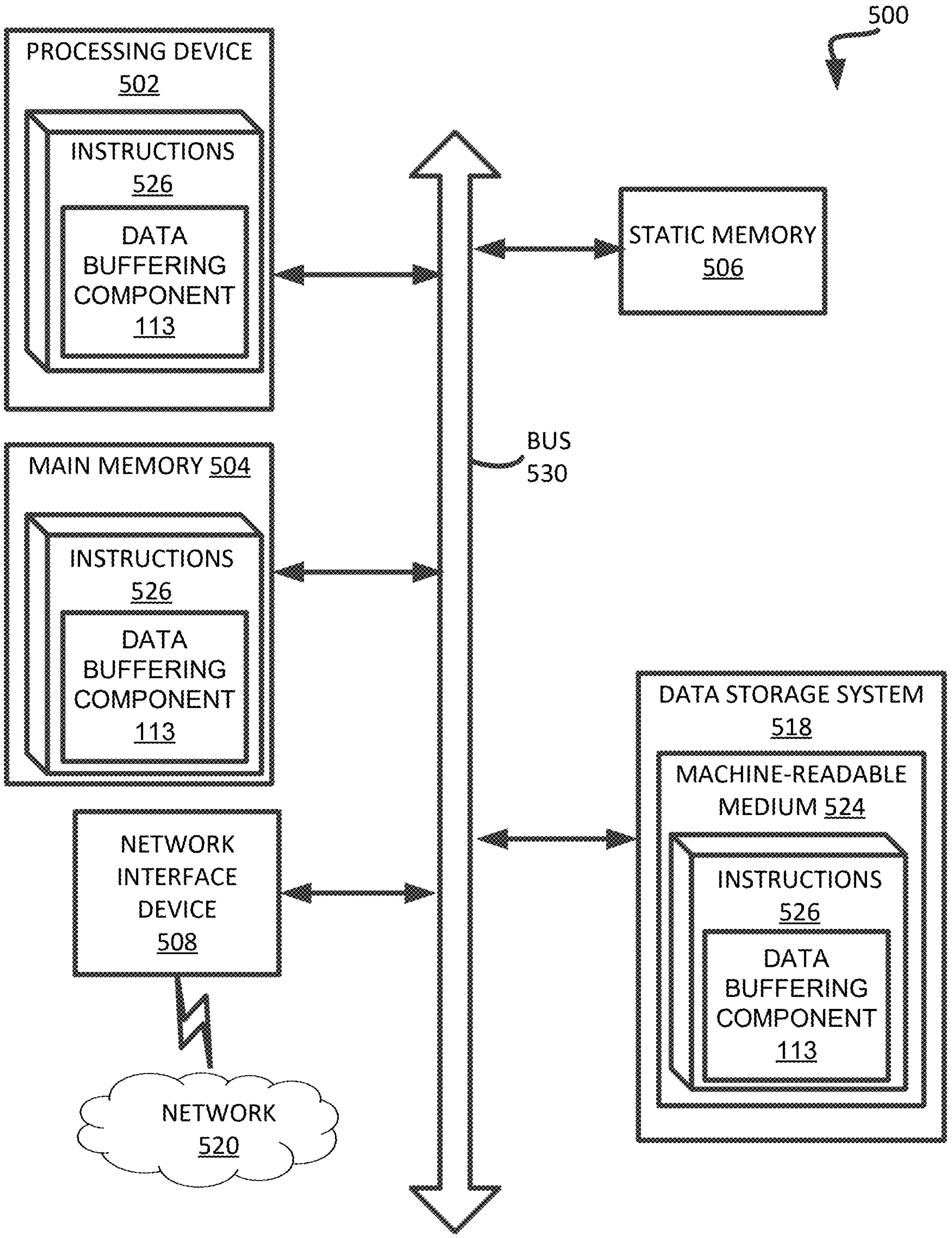
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data buffering component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the data buffering component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
- a memory device comprising a first portion configured as a program buffer and a second portion configured as primary memory;
- a processing device, operatively coupled with the memory device, to perform operations comprising:
  - determining that an amount of host data in the program buffer satisfies a buffer threshold criterion;
  - initiating an initial program pass of first host data from the program buffer to the primary memory, wherein the initial program pass comprises reading the first host data directly from the program buffer to program the primary memory;
  - determining that the first host data is to be evicted from the program buffer; and
  - initiating a final program pass of the first host data from the program buffer to the primary memory, wherein the final program pass comprises reading the first host data directly from the program buffer to program the primary memory.

2. The memory sub-system of claim 1, wherein the processing device is to perform operations further comprising:
- receiving the first host data to be programmed to the memory device; and
- initiating a program of the first host data to the program buffer.

3. The memory sub-system of claim 1, wherein the processing device is to perform operations further comprising:
- responsive to completing the final program pass of the first host data to the primary memory, evicting the first host data from the program buffer.

4. The memory sub-system of claim 1, wherein the threshold criterion is configurable based on an overwrite rate of the host data in the program buffer.

5. The memory sub-system of claim 1, wherein the first portion of the memory device configured as the program buffer comprises a set of memory cells configured as single-level cell (SLC) memory or multi-level cell (MLC) memory.

6. The memory sub-system of claim 1, wherein the second portion of the memory device configured as the primary memory comprises a set of memory cells configured as tri-level cell (TLC) memory or quad-level cell (QLC) memory.

7. The memory sub-system of claim 1, wherein the initial program pass comprises coarsely programming memory cells in the primary memory to initial values representing a plurality of pages of the first host data, and wherein the final program pass comprises finely programming the memory cells in the primary memory to final values representing the plurality of pages of the first host data.

8. A method comprising:

determining that an amount of host data in a first portion of a memory device configured as a program buffer satisfies a buffer threshold criterion;

initiating an initial program pass of first host data from the program buffer to a second portion of the memory device configured as a primary memory, wherein the initial program pass comprises reading the first host data directly from the program buffer to program the primary memory;

determining that the first host data is to be evicted from the program buffer; and initiating a final program pass of the first host data from the program buffer to the primary memory, wherein the final program pass comprises reading the first host data directly from the program buffer to program the primary memory.

9. The method of claim 8, further comprising:

receiving the first host data to be programmed to the memory device; and initiating a program of the first host data to the program buffer.

10. The method of claim 8, further comprising:

responsive to completing the final program pass of the first host data to the primary memory, evicting the first host data from the program buffer.

11. The method of claim 8, wherein the threshold criterion is configurable based on an overwrite rate of the host data in the program buffer.

12. The method of claim 8, wherein the first portion of the memory device configured as the program buffer comprises a set of memory cells configured as single-level cell (SLC) memory.

13. The method of claim 8, wherein the second portion of the memory device configured as the primary memory comprises a set of memory cells configured as quad-level cell (QLC) memory.

14. The method of claim 8, wherein the initial program pass comprises coarsely programming memory cells in the primary memory to initial values representing a plurality of pages of the first host data, and wherein the final program pass comprises finely programming the memory cells in the primary memory to final values representing the plurality of pages of the first host data.

15. A non-transitory computer-readable storage medium comprising instructions that, when executed by a processing device, cause the processing device to perform operations comprising:

determining that an amount of host data in a first portion of a memory device configured as a program buffer satisfies a buffer threshold criterion;

initiating an initial program pass of first host data from the program buffer to a second portion of the memory device configured as a primary memory, wherein the initial program pass comprises reading the first host data directly from the program buffer to program the primary memory;

determining that the first host data is to be evicted from the program buffer; and initiating a final program pass of the first host data from the program buffer to the primary memory, wherein the final program pass comprises reading the first host data directly from the program buffer to program the primary memory.

16. The non-transitory computer-readable storage medium of claim 15, wherein the instructions cause the processing device to perform operations further comprising:

receiving the first host data to be programmed to the memory device; and initiating a program of the first host data to the program buffer.

17. The non-transitory computer-readable storage medium of claim 15, wherein the instructions cause the processing device to perform operations further comprising:

responsive to completing the final program pass of the first host data to the primary memory, evicting the first host data from the program buffer.

18. The non-transitory computer-readable storage medium of claim 15, wherein the threshold criterion is configurable based on an overwrite rate of the host data in the program buffer.

19. The non-transitory computer-readable storage medium of claim 15, wherein the first portion of the memory device configured as the program buffer comprises a set of memory cells configured as single-level cell (SLC) memory, and wherein the second portion of the memory device configured as the primary memory comprises a set of memory cells configured as quad-level cell (QLC) memory.

20. The non-transitory computer-readable storage medium of claim 15, wherein the initial program pass comprises coarsely programming memory cells in the primary memory to initial values representing a plurality of pages of the first host data, and wherein the final program pass comprises finely programming the memory cells in the primary memory to final values representing the plurality of pages of the first host data.

* * * * *